Patented Nov. 29, 1949

2,489,380

UNITED STATES PATENT OFFICE 2,489,380

5-HYDROXYMERCURIVANILLIN AND METHODS OF MAKING THE SAME

Harry F. Lewis and Irwin A. Pearl, Appleton, Wis., assignors, by mesne assignments, to Sulphite Products Corporation, a corporation of Wisconsin No Drawing. Application July 18, 1945, Serial No. 605,853

4 Claims. (Cl. 260—434)

Our invention relates to disinfectants and more specifically to the production of a cheap and effective disinfectant particularly adapted for such uses as slime control, especially on the wet end of paper machines and in white-water systems; disinfection of paper making felts; control of the micro-organisms that obstruct alum lines; prevention of deterioration of coatings, adhesives and plasticizers; preservation of stored pulp lap; reduction of bacteria in paper and container board; and production of mildew-proof board and coated paper; cold water paints; protection of lumber and related products against sap stain and dry rot; mildewproofing textiles generally and as a fungicide in the leather industry.

*Example I.—5-hydroxymercurivanillin from vanillin*

A mixture of 30.4 g. (0.2 mol) of vanillin, 43.2 g. (0.2 mol) of mercuric oxide, 32.0 g. (0.8 mol) of sodium hydroxide, and 200 g. of water was heated to boiling under reflux for one hour and cooled. The reaction mixture was filtered and the precipitate (a little unchanged mercuric oxide) was washed with water. The combined filtrate and washings were acidified with dilute hydrochloric acid which caused a white flocculent precipitate to separate. The precipitate was filtered, washed with water and dried. 5-hydroxymercurivanillin was obtained as a white powder melting at 235–236°. The yield is substantially quantitative depending upon the type of mercuric oxide used.

The type of mercuric oxide used determines the time necessary for completion of the reaction. Very reactive freshly prepared oxides react in a short time and leave very little if any unchanged oxide. Less reactive dry oxides require more time for reaction. Dry red mercuric oxide is less reactive than dry yellow mercuric oxide. However, with sufficient boiling, all forms of the oxide work in the process. The nature of the acidifying agent is of little consequence as long as nitric acid or sulfur dioxide is not employed. We have obtained very satisfactory results with hydrochloric, sulfuric, carbonic, and acetic acids.

*Example II.—5-hydroxymercurivanillin from basic calcium lignosulfonate*

A mixture of 1080 g. (5 mols) of mercuric oxide (freshly prepared from cold solutions of 1590 g. (5 mols) of mercuric acetate and excess of sodium hydroxide), 800 g. (20 mols) of sodium hydroxide, 250 g. of basic calcium lignosulfonate (containing 60% lignin), and 5 liters of water was heated to boiling with stirring under reflux condenser for 12 hours and filtered. This filtrate contains the disinfectant in alkaline solution, and is suitable for use as such, without further treatment.

*Example III.—Solid 5-hydroxymercurivanillin from basic calcium lignosulfonate*

If it is desired to have a solid product for shipment the filtrate may be treated with carbon dioxide to secure a very light colored precipitate without bringing the pH to neutrality. The precipitate secured is a mixture of mercurated compounds but it is chiefly 5-hydroxymercurivanillin and is substantially free from lignin. It may be filtered, washed with water and dried and with the amounts given in this example the yield is on the order of 175 grams of dried product.

Stronger acidification with hydrochloric acid or sulfuric acid will secure a higher yield. This more copious yield is dark in color and is contaminated with precipitated lignin and mercurated lignin. However, both the light colored product and the dark colored product perform equally well as antiseptics.

We have found that in place of the basic calcium ligno-sulfonate, any other lignin product can be used. For instance, alkali lignin, Kraft lignin, Scholler lignin, alkali black liquor, and Kraft black liquor give satisfactory results. Sulfite waste liquor gives the same results as basic calcium lignosulfonate except that considerably more mercuric oxide and alkali are required to reduce the carbohydrate content of the liquor. The alkali and Kraft lignins and liquors require less added alkali.

*Example IV.—5-acetoxymercurivanillin*

Following Paolini's procedure (Gazz. chim. ital. 51 II, 188 (1921)) 10.5 grams of yellow mercuric oxide were dissolved in 250 ml. of warm glacial acetic acid. To this solution were added 7.4 grams of vanillin, and the mixture was heated to boiling and allowed to cool. Most of the acetic acid was distilled under reduced pressure, and the residue was diluted with water. The white precipitate of crude 5-acetoxymercurivanillin was filtered and washed with water. The yield was 18.4 grams (98.0%).

*Example V.—5-acetoxymercurivanillin*

We have also prepared 5-acetoxymercurivanillin by boiling 5-hydroxymercurivanillin in glacial acetic acid until completely dissolved and then diluting with water. The 5-acetoxymercurivanillin was obtained as a fine crystalline powder sintering at 196–198°.

*Example VI—5-chloromercurivanillin*

A suspension of 5-acetoxymercurivanillin in 10% sodium chloride solution was boiled for one hour and allowed to stand several hours. The appearance of the precipitate changed. The precipitate was filtered, washed with water and dried. The yield of 5-chloromercurivanillin melting above 300° amounted to 97.2%.

*Inhibition tests*

We have tested these materials against three organisms, namely, *Aerobacter aerogenes*, *Bacillus mycoides*, and *Aspergillus niger*. The first was selected as a representative species of non-spore-forming bacteria which are frequently found in paper-mill slimes. The second was selected as a representative species of aerobic spore-forming bacteria which are found in paper samples. The third and last was selected as a representative species of the fungi commonly designated as molds.

The results of these tests are as indicated in the following table:

*Inhibiting concentration—per cent by weight*

|  | Aerobacter aerogenes | Bacillus mycoides | Aspergillus niger |
|---|---|---|---|
| 5-Hydroxymercurivanillin. | 0.0004 | less than 0.0002 | 0.0010 |
| 5-Acetoxymercurivanillin. | 0.0004 | less than 0.0002 | 0.0022 |
| 5-Chloromercurivanillin. | 0.0004 | less than 0.0002 | 0.0018 |
| Solution according to Example II. |  | 0.0006 |  |
| Precipitate material according to Example III. | 0.0006 | 0.0006 | 0.0022 |

These results compare most advantageously with the effectiveness of other disinfectants available in this field.

We have also conducted comparative toxicity tests on the Lake Emerald shiner (*Notropis atherinoides*) known to research workers in this field to be one of the most sensitive test fish for toxicity studies. These tests have shown that the toxicity of the products of Examples I, II and III is decidedly less than that of prior disinfectants which have toxicity toward micro-organisms in the same range as the products of this invention.

Without further elaboration the foregoing will so fully explain our invention that others may readily adapt the same for use under various conditions of service. In most wet manufacturing processes the disinfectant can be conveniently applied by making up a stock solution in dilute alkali. Such a solution, containing 1% of the disinfectant, may be added to liquid baths in the ratio of one part of disinfectant solution to 2500 parts of the bath to secure an effective concentration of 0.0004%. Many other convenient expedients well known in the art are available for applying the material to products which are eventually to be secured in solid form. In the final dilute form in which it is effective on the micro-organism best results are obtained if the pH is low enough so that the active ingredient is present as 5-hydroxymercurivanillin and not as the alkali metal salt. For many of the uses outlined above mere dilution is all that is required to secure this result. In others it is a simple matter to have the main mass of material very slightly on the acid side. The amount of disinfectant added is so minute that adding it makes no material change in the pH of the mass as a whole. The products of Examples II and III are known to contain mercurated compounds of value as disinfectants, other than 5-hydroxymercurivanillin, but definite identification of these other compounds has not yet been achieved.

We claim:

1. 5-hydroxymercurivanillin.

2. The method of producing 5-hydroxymercurivanillin which comprises reacting vanillin in hot alkaline solution with mercuric oxide.

3. The method of producing 5-hydroxymercurivanillin which comprises reacting basic calcium lignosulfonate in hot alkaline solution with mercuric oxide.

4. The method of producing a disinfectant composition containing 5-hydroxymercurivanillin which comprises reacting a lignin substance with a hot solution of sodium hydroxide and mercuric oxide, said lignin substance being selected from the group of lignin substances present in alkali, Kraft and sulfite waste pulping liquors.

HARRY F. LEWIS.
IRWIN A. PEARL.

REFERENCES CITED

The following references are of record in the file of this patent:

UNITED STATES PATENTS

| Number | Name | Date |
|---|---|---|
| 1,604,778 | Klages | Oct. 26, 1926 |
| 1,693,432 | Bockmuhl et al. | Nov. 27, 1928 |
| 2,157,009 | Perkins | May 2, 1939 |

OTHER REFERENCES

Organic Mercury Compounds, by Whitmore, 1921, page 323.

Paolini: "Gazz. Chim. Ital.," vol. 51, pt. II, pages 188–194 (1921).

Nameli et al.: "Gazz. Chim. Ital.," Vol. 52, pt. II, page 3 (1922).

Henry et al.: (I) "Jour. Chem. Soc." (London), vol. 121, pages 1056–1057 (1922).

Henry et al.: (II) "Jour. Chem. Soc." (London), vol. 1930, pages 2279–2289.